United States Patent
Miyoshi et al.

(10) Patent No.: US 7,502,510 B2
(45) Date of Patent: Mar. 10, 2009

(54) VECTOR-GRAPHIC DATA PROCESSING METHOD AND DRAWING APPARATUS

(75) Inventors: Hisaji Miyoshi, Saitama (JP); Takashi Okuyama, Saitama (JP)

(73) Assignee: ORC Manufacturing Co., Ltd., Tokyo (JP)

( * ) Notice: Subject to any disclaimer, the term of this patent is extended or adjusted under 35 U.S.C. 154(b) by 826 days.

(21) Appl. No.: 10/933,306

(22) Filed: Sep. 3, 2004

(65) Prior Publication Data

US 2005/0065623 A1    Mar. 24, 2005

(30) Foreign Application Priority Data

Sep. 5, 2003    (JP) ............... 2003-314009

(51) Int. Cl.
*G06K 9/48* (2006.01)
(52) U.S. Cl. ..................... 382/190
(58) Field of Classification Search ............. 700/90; 382/190
See application file for complete search history.

(56) References Cited

U.S. PATENT DOCUMENTS

| | | | |
|---|---|---|---|
| 5,980,088 A | 11/1999 | Iwasaki et al. | |
| 6,100,915 A | 8/2000 | Iwasaki et al. | |
| 6,493,064 B2 * | 12/2002 | Cabiri et al. | 355/53 |
| 6,593,066 B2 * | 7/2003 | Cabiri et al. | 430/319 |
| 6,760,054 B1 * | 7/2004 | Okuyama | 347/234 |
| 6,979,605 B2 * | 12/2005 | Yamazaki et al. | 438/166 |
| 7,050,878 B2 * | 5/2006 | Yamazaki et al. | 700/121 |
| 7,050,979 B2 * | 5/2006 | Mizutani et al. | 704/277 |
| 2002/0118350 A1 * | 8/2002 | Cabiri et al. | 355/72 |
| 2003/0001798 A1 | 1/2003 | Okuyama | |
| 2003/0011860 A1 | 1/2003 | Okuyama | |

FOREIGN PATENT DOCUMENTS

| | | |
|---|---|---|
| JP | 8-263669 | 11/1996 |
| JP | 2003-57836 | 2/2003 |

OTHER PUBLICATIONS

English Language Abstract of JP 2003-57836.
U.S. Appl. No. 10/933,307 to Okuyama, filed Sep. 3, 2004.

* cited by examiner

*Primary Examiner*—Duy M Dang
(74) *Attorney, Agent, or Firm*—Greenblum & Bernstein, P.L.C.

(57) ABSTRACT

In a data processing method, all information on a figure to be drawn, as vector-graphic data representing said figure, is transmitted to a drawing apparatus. The vector-graphic data is processed to form an image, as raster-graphic data representing the figure, and the run length data is extracted from the image. The run length data is grouped to become grouped run length data, and outline vector-graphic data, that is having a smaller data amount than that of the vector-graphic data, and that is based on an outline of the figure represented by the grouped run length data, is created. In another data processing method, the drawing data is processed in a workstation such as a CAD system, and the resulting outline vector graphic data is transmitted to the drawing apparatus.

15 Claims, 15 Drawing Sheets

FIG. 5

| RUN LENGTH DATA | | | INDEX ARRAY |
|---|---|---|---|
| LINE NUMBER F | MEMORY NUMBER LNO | LBUF [LNO] | IS[F],IE[F] |
| 3 | 0 | $LS_0$ | $IS[3]=0, IE[3]=0$ |
| 3 | 1 | $LE_0$ | $IS[3]=0, IE[3]=2$ |
| 4 | 2 | $LS_1$ | $IS[4]=IE[4]=2, IE[3]=2$ |
| 4 | 3 | $LE_1$ | $IS[4]=2, IE[4]=4$ |
| 5 | 4 | $LS_2$ | $IS[5]=IE[5]=4, IE[4]=4$ |
| 5 | 5 | $LE_2$ | $IS[5]=4, IE[5]=6$ |
| 5 | 6 | $LS_3$ | $IS[5]=4, IE[5]=6$ |
| 5 | 7 | $LE_3$ | $IS[5]=4, IE[5]=8$ |
| .. | .. | .. | .. |

VECTOR-GRAPHIC DATA PROCESSING METHOD AND DRAWING APPARATUS

BACKGROUND OF THE INVENTION

1. Field of the Invention

The present invention relates to a drawing method for drawing a pattern on a surface of a workpiece, using an exposure drawing apparatus including a plurality of optical modulation elements, and also relates to an exposure drawing apparatus in which the drawing method is executed.

2. Description of the Related Art

Conventionally, a drawing apparatus is used for optically drawing fine patterns and symbols such as characters on the surface of a workpiece. A representative use of the drawing apparatus is for a circuit pattern drawn on a workpiece when a printed circuit board is manufactured by using photolithography. In this case, the workpiece may be either a photosensitive film for producing a photomask or a photoresist layer formed on a suitable substrate.

In the conventional drawing apparatus, the drawing image (raster-graphic data) for exposing the workpiece, is produced based on vector-graphic data (circuit data) transmitted from a CAD system and so on. In this drawing method, resolution is limited by the number of pixels. The data-conversion load and data-transmittance load can be heavy because the amount of data must be increased to improve resolution.

SUMMARY OF THE INVENTION

Therefore, an object of the present invention is to provide a data processing method for reducing the amount of data representing figures to be drawn.

Another object of the present invention is to provide a drawing apparatus in which the aforesaid data processing is executed.

A data processing method according to the present invention, includes a data extracting step, a data grouping step, and a outline data creating step. In the data extracting step, run length data is extracted from an image, as raster-graphic data representing a figure to be drawn. In the data grouping step, the run length data is grouped to become grouped run length data, and in the outline data creating step, outline vector-graphic data having a smaller data amount than that of the raster-graphic data, and based on an outline of the figure represented by the grouped run length data, is created.

The data extracting step may include a run length data extracting step and a run length data storing step. In the run length data extracting step, coordinate system values of a starting point and an ending point of the run length data are extracted by scanning the image along a first scanning line that is parallel to a coordinate axis of a coordinate system that defines the image. In the run length data storing step, the coordinate system values of a starting point and an ending point are stored in a data memory, the starting point and an ending point being related to line numbers defining the scanning lines.

The data grouping step may include a run length data duplication detecting step and a grouped data creating step. In the run length data duplication detecting step, a duplication of a first run length data on the first scanning line, and a second run length data on a second scanning line, next to the first scanning line, is detected, based on the coordinate system values of starting points and ending points of the first run length data and the second run length data, and the line numbers of the first scanning line and the second scanning line. In the grouped data creating step, a starting points group is created by grouping the starting points of the first and the second run length data, and an ending points group is created by grouping the ending points of the first and the second run length data, when a duplication of the first and the second run length data is detected in the run length data duplication detecting step.

The outline data creating step may include a starting-side outline data creating step and an ending-side outline data creating step. In the starting-side outline data creating step, starting-side outline vector-graphic data is created from the starting points group. In the ending-side outline data creating step, ending-side outline vector-graphic data is created from the ending points group.

The outline data creating step can further include an outline point extracting step in which the outline points are extracted from the starting-side outline vector-graphic data, after approximating the starting-side outline vector-graphic data to continuous segments, by using a thinning process in which part of the starting-side outline vector-graphic data is excluded as excluded starting-side outline vector-graphic data, and the outline points are extracted from the ending-side outline vector-graphic data, after approximating the ending-side outline vector-graphic data to continuous segments, by using a thinning process in which part of the ending-side outline vector-graphic data is excluded as excluded ending-side outline vector-graphic data.

In the outline point extracting step, a ratio of the excluded starting-side outline vector-graphic data to the starting-side outline vector-graphic data can be changed, and a ratio of the excluded ending-side outline vector-graphic data to the ending-side outline vector-graphic data can be changed, by setting an optional resolution for drawing the figure.

The drawing data processing method can further include, an image forming step in which the image is formed by processing vector-graphic data.

The drawing data processing method can further include a transmitting step in which all information on the figure, as the vector-graphic data representing the figure, is transmitted to a drawing data processing apparatus in which the drawing data processing method is executed.

The image forming step can be carried out in which part of an image is formed by processing part of the vector-graphic data. And the image forming step, the data extracting step, the data grouping step, and the outline data creating step are repeated so that the outline vector-graphic data represents all information on the figure.

In the drawing data processing method, the vector-graphic data may be plural layers.

Another drawing data processing method according to the present invention, includes an image forming step in which an image, as raster-graphic data representing a figure to be drawn, is formed by processing vector-graphic data representing the figure. The drawing data processing method also includes a data extracting step, a data grouping step, an outline data creating step, and a transmitting step. In the data extracting step, run length data is extracted from the image, and in the data grouping step, the run length data is grouped to become grouped run length data. In the outline data creating step, the outline vector-graphic data, having a smaller data amount than that of the vector-graphic data, and based on an outline of the figure represented by the grouped run length data, is created. And in the transmitting step, the outline vector-graphic data is transmitted from a workstation in which the data extracting step, the data grouping step, and the outline data creating step are executed, to a drawing apparatus for drawing the figure.

In accordance with another aspect of the present invention, there is provided a drawing data processing apparatus that has a data extractor, a data grouping processor, and an outline data creator. The data extractor extracts run length data from an image, as raster-graphic data representing a figure to be drawn. The data grouping processor groups the run length data to become grouped run length data, and the outline data creator that creates outline vector-graphic data having a smaller data amount than that of the raster-graphic data, and based on an outline of the figure represented by the grouped run length data.

The drawing data processing apparatus may also include an image former that forms the image by processing vector-graphic data. And the drawing data processing apparatus may also include a receiver that receives information on the figure, as the vector-graphic data representing the figure to be drawn. Further, the drawing data processing apparatus may include a transmitting step, in which the outline vector-graphic data is transmitted to a drawing apparatus for drawing the figure.

In accordance with another aspect of the present invention, there is provided a drawing data processing system that has a workstation and a drawing data processing apparatus. The workstation has a transmitter that transmits information on a figure to be drawn, as vector-graphic data representing the figure. The drawing data processing apparatus has a receiver that receives the information as vector-graphic data representing the figure, an image former that forms an image, as raster-graphic data representing the figure, by processing the vector-graphic data, and a data extractor that extracts run length data from the image, a data grouping processor that groups the run length data to become grouped run length data, and an outline data creator that creates outline vector-graphic data, having a smaller data amount than that of the vector-graphic data, and based on an outline of the figure represented by the grouped run length data.

In accordance with another aspect of the present invention, there is provided a computer program for processing drawing data. The computer program has the steps of extracting run length data from an image, as raster-graphic data representing a figure to be drawn, grouping the run length data to become grouped run length data, and creating outline vector-graphic data, having a smaller data amount than that of the raster-graphic data, and based on an outline of the figure represented by the grouped run length data.

BRIEF DESCRIPTION OF THE DRAWINGS

The present invention will be better understood from the description of the preferred embodiment of the invention set forth below together with the accompanying drawings, in which:

FIG. 5 is a table showing indexes of starting and ending points of the run length data;

DESCRIPTION OF THE PREFERRED EMBODIMENTS

Figure 1:
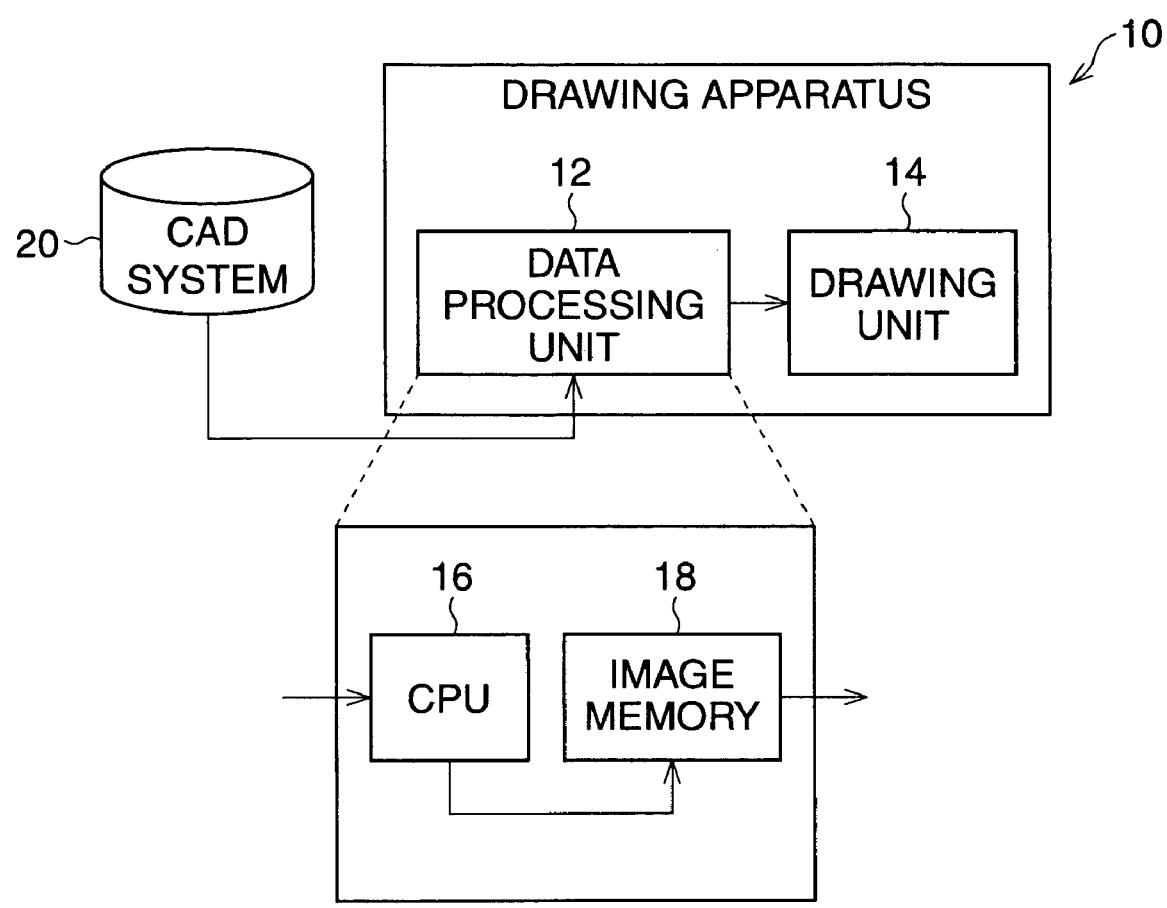
FIG. 1 is a view of a drawing apparatus used for processing drawing data according to the method of the present invention.

Hereinafter, the preferred embodiment of the present invention is described with reference to the attached drawings. FIG. 1 is a view of a image apparatus used for processing drawing data according to the method of the present invention.

A drawing apparatus 10 is designed to draw circuit patterns directly on a photo-resist layer formed on a printed circuit board. The drawing apparatus 10 comprises a data processing unit 12 and a drawing unit 14. The data processing unit 12 has a CPU 16 and an image memory 18. The drawing apparatus 10 is connected to a CAD system 20 of an upper CPU (a work station). Data representing images to be drawn is transmitted to the drawing apparatus 10 from the CAD system 20. Data transmitted to the drawing apparatus 10, is processed as mentioned below, and sent to the drawing unit 14 for drawing the figures.

Figure 2:
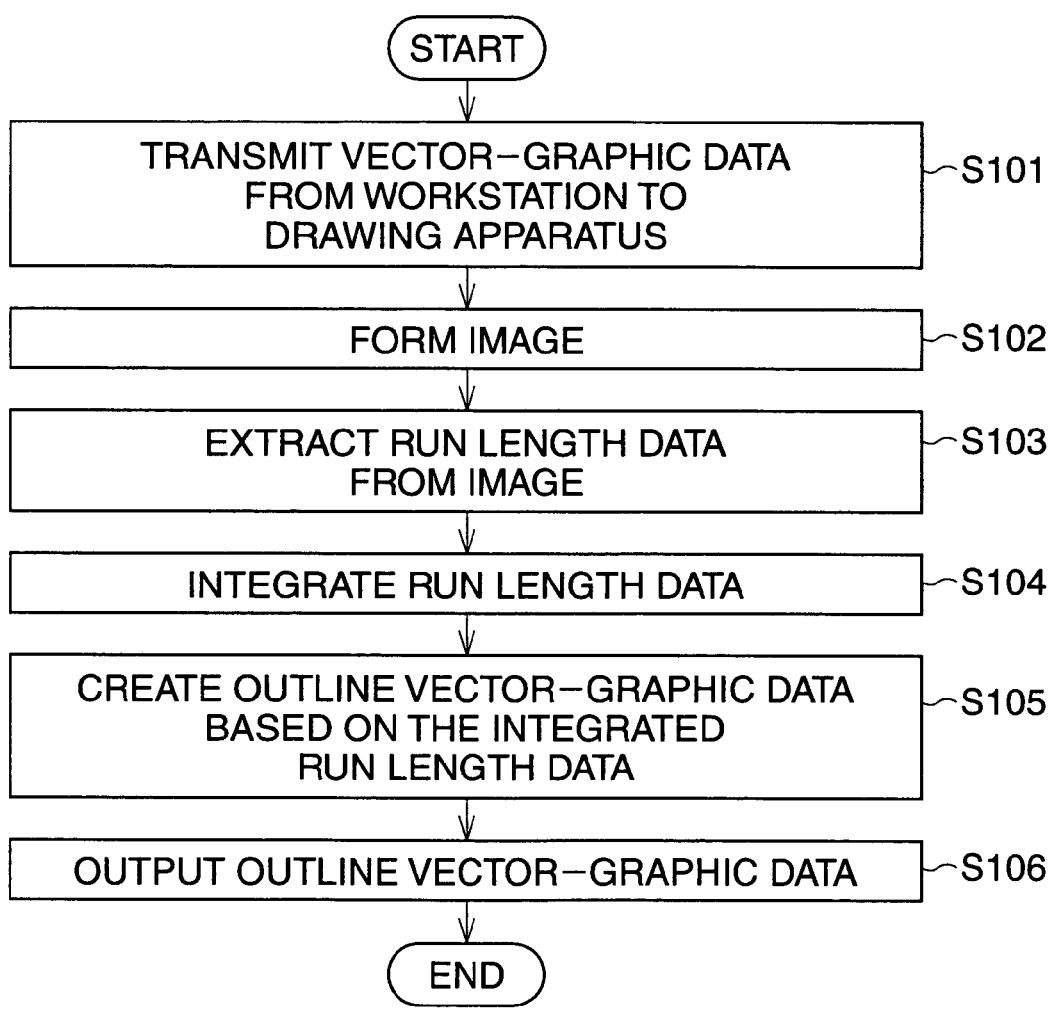
FIG. 2 is a flowchart representing the whole process for drawing images.

FIG. 2 is a flowchart representing the whole process for drawing figures.

At step S101, information on the figures to be drawn is transmitted to the drawing apparatus 10 from a workstation as vector-graphic data (a transmitting step).

At step S102, in the drawing apparatus 10, an image as raster-graphic data is formed based on the vector-graphic data (an image forming step).

At step S103, run length data is extracted from the image, and at step S104, run length data is grouped to become grouped run length data (a data grouping step).

At step S105, outline vector-graphic data is created based on outlines of figures represented by the grouped run length data (an outline data creating step). And at step S106, the outline vector-graphic data is output, and then data processing is finished.

As mentioned above, vector-graphic data, of information on a figure to be drawn on a drawing surface, transmitted to the drawing apparatus 10, is finally converted by various processes to the outline vector-graphic data representing a smaller data amount than that of the vector-graphic data and raster-graphic data.

Figure 3:
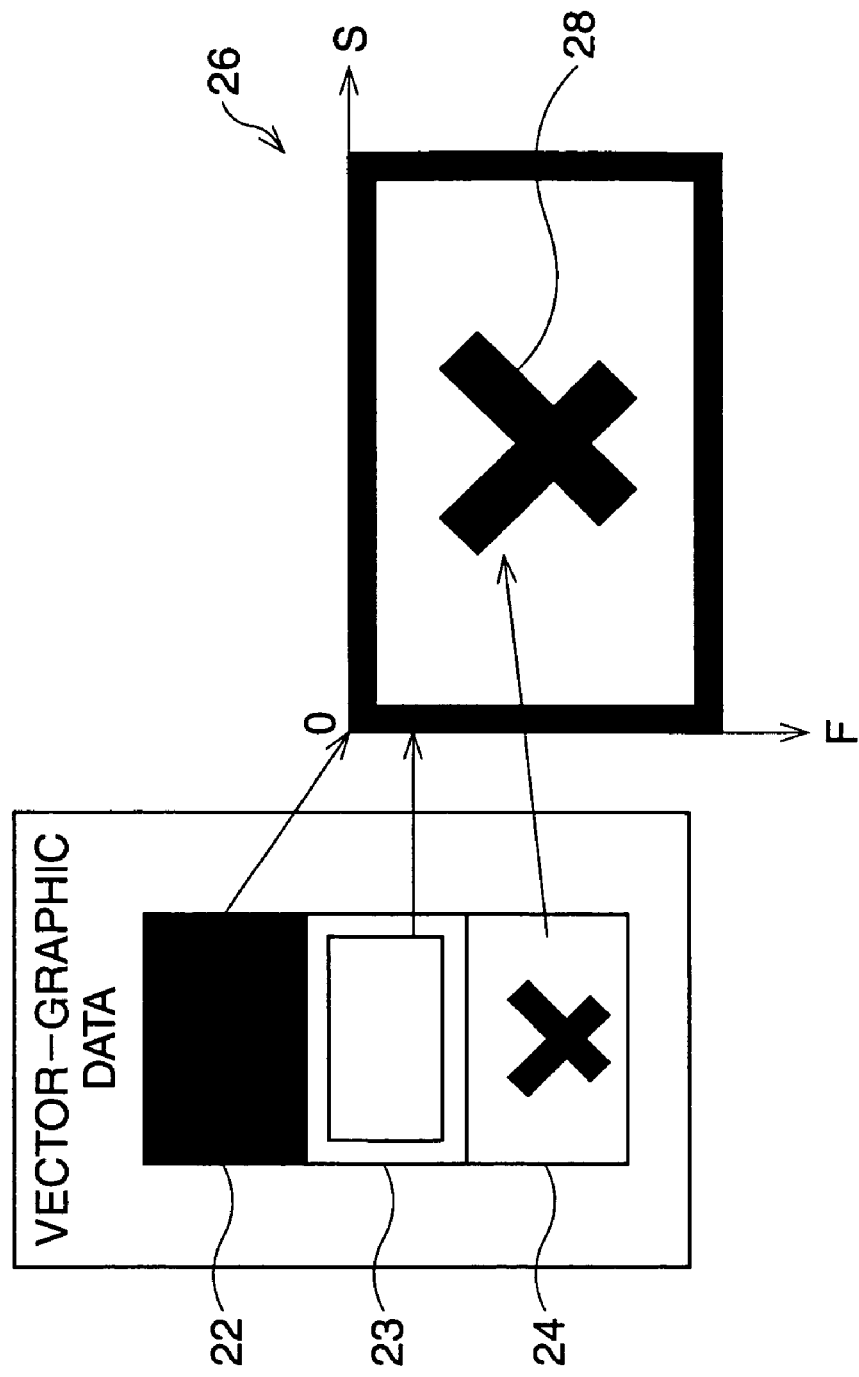
FIG. 3 is a conceptual view of an image created based on the vector-graphic data.

FIG. 3 is a conceptual view of an image created based on the vector-graphic data.

Information on the figures to be drawn is transmitted to the drawing apparatus 10 from the CAD system 20 as vector-graphic data having a layer structure (a transmitting step). The vector-graphic data received by the drawing apparatus 10, is processed by the CPU 16, and an image 26 is formed by a bitmap process (an image forming step). Here, a drawing-coordinate-system is defined as being used for forming the image in the CPU 16. The drawing-coordinate-system has a scanning coordinate (S-coordinate), and a feeding coordinate (F-coordinate). As shown in the FIG. 3, the positive direction of an axis of the S-coordinate (S-axis) is rightward, and positive direction of an axis of the F-coordinate (F-axis) is downward. In this embodiment, the vector-graphic data has three layers 22-24. Each layer has information for position, shape, size, and color of the closed figures to be drawn. In this case, color information of the figures to be drawn means, black is for "being drawn" and white is for "not being drawn". Therefore, a layer 22 means a whole area is black, a layer 23 means a rectangular area is white, an a layer 24 means an "X" character area is black in this example.

To form an image by mixing layers of vector-graphic data, a reading order for the layers is determined. The order for the reading of the layers is determined based on F-coordinate system values of points on the outlines of figures. That is, a point having the smallest F-coordinate system value on an outline of a figure in a layer is chosen as a smallest point, and a layer having a smaller F-coordinate system value of the smallest point is sequentially read on a rotating basis.

In FIG. 3, the layer 22 is first, the layer 23 is second, and the layer 23 is third. Being read in this order, the layers 22-24 form an image 26 (an image forming step).

Figure 4:
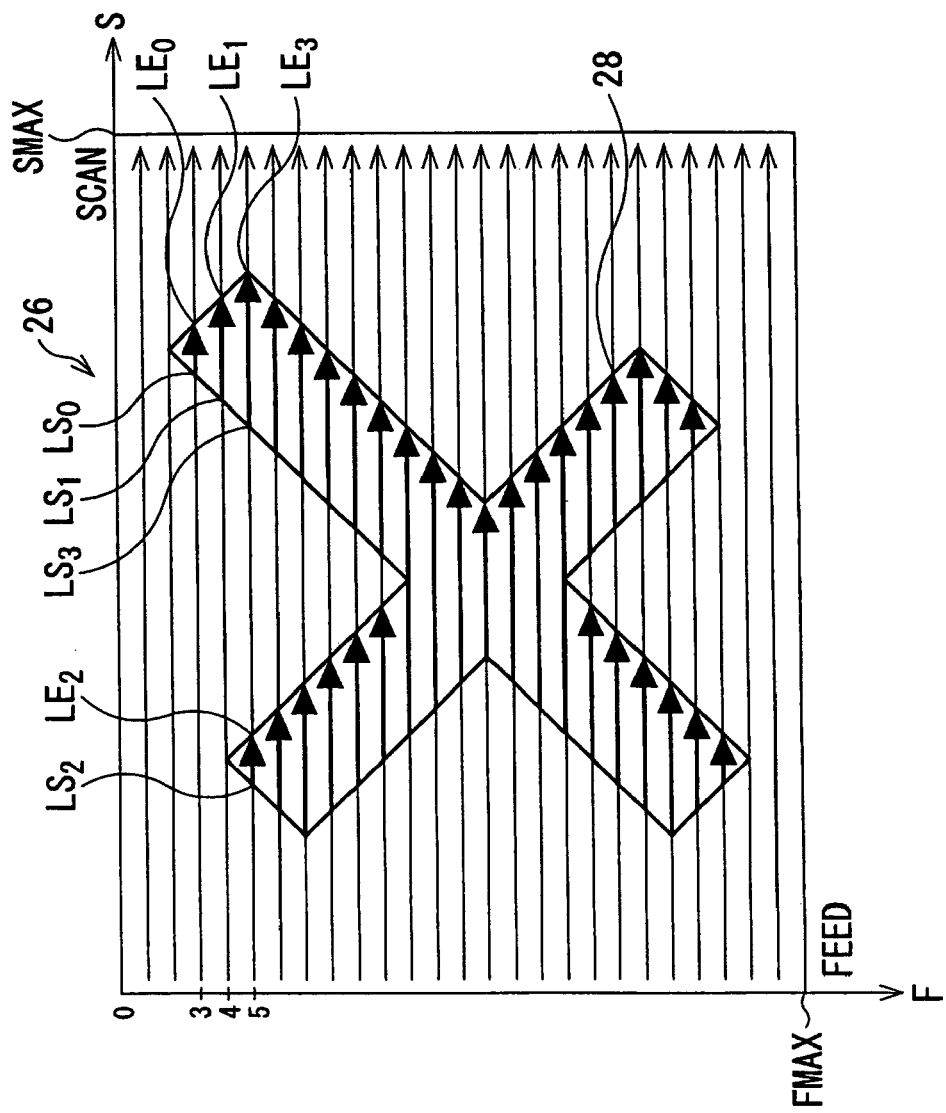
FIG. 4 is a view showing run length data of the image.

FIG. 4 is a view showing run length data of the image 26. Here, figures represented by the layer 22 and 23 are omitted.

As mentioned above, the image 26 is formed from bitmap data based on the vector-graphic data transmitted from the CAD system 20 (see FIG.3). Therefore, all of the points that are included in the image 26, and that have integer values for both F and S coordinates (called "bit data" hereinafter) of the drawing-coordinate-system have either data "1" representing "to be drawn", or data "0" representing "not to be drawn". Here, to determine an exposed zone, run length data, that is a continuum of bits having data "1" shown by arrows inside the drawn image 28, is extracted (a data extracting step). The method of extracting the run length data is explained below.

First, to find run length data, horizontal scanning to check whether each bit has data "1" or "0" is carried out in the drawing-coordinate-system. The first scanning is conducted along the S-axis in the positive direction, bits on the scanning line are checked. And then, the scanning finishes on a line (S=SMAX) that determines the end of the image 26, and which is parallel to the F-axis. After that, horizontal scanning is repeated along lines F=1,2,3 to N (N is integer) parallel to the S-axis, and scanning finishes on a line (F=FMAX) that determines the end of the image 26. In this scanning, when a bit having data "1", domes after a bit having data "0", the bit having data "1" is the starting point LS of the run length data. Continuous bits having data "1" form the run length data, and a bit having data "1" followed by a bit having data "0", is the ending point LE of the run length data. In the case where the run length data continues until the last bit on scanning lines, a point on the line S=SMAX determining the end of the image 26 becomes the ending point LE. As explained above, run length data is extracted (an extracting step).

FIG. 5 is a table showing indexes of starting and ending points of the run length data.

When run length data is extracted, the S-coordinate system values of the starting and ending points of the run length data are memorized in a "run length data memory buffer array LBUF", in the image memory 18. And the array indexes representing the address of data are obtained to avoid duplicated reading of the run length data and thereby achieving prompt data processing. The memory storage method of the S-coordinate system values and indexes is explained below.

In the drawn image 28 shown in FIG. 4, run length data having the starting point LS0 and ending point LE0 are found first on line F=3 (called "the line [3]" and a line F=N is called "the line [N]" as well hereinafter). A series of memory-numbers LNO are assigned following the extraction turns, from "0", for starting points LS and ending points LE, for controlling data addresses. Here, the LNO of the starting point LS0 is "0" and the LNO of the ending point LE0 is "1". Therefore, the starting point LS0 is memorized in the run length data memory buffer array LBUF[LNO=0], meaning the array element LBUF[0] represented by the array index "0" in the LBUF, and the ending point LE0 is memorized in the run length data memory buffer array LBUF[LNO=1]. Here, the fact that the starting point LS0 and the ending point LE0 are memorized in the run length data memory buffer array LBUF, means that each of the S-coordinate system values of the starting and ending points of the run length data are memorized in the array element of the run length data memory buffer array LBUF.

After the first starting point LS and the final ending point LE of the line [F] are extracted, an index array IS[F], representing an address showing where the first starting point LS of the line [F] is stored in the LBUF, is assigned to the first starting point LS, and an index array IE[F] representing an address showing where the final ending point LE of the line [F] is stored in the LBUF is assigned to the final ending point LE. That is, the "memory number" LNO of the first extracted starting point LS of a line [F] becomes an index array IS[F], and the LNO of the first extracted starting point LS of the next line [F+1] becomes an index array IE[F], instead of the "memory number" LNO of the final extracted ending point LE of the line [F]. This means, the address of the final ending point LE of the line [F], is represented by the address of the first starting point LS of the next line [F+1]. In the embodiment, the "memory number" LNO=0 of the starting point LS0 extracted first in the line [3], is provided to the index array IS[3], and the "memory number" LNO=2 of the starting point LS1 extracted first in the line [4] is provided to the index array IE[3], instead of the "memory number" LNO of the ending point LE0 extracted last in the line [3]. Thus, an index array IE[3] representing the address of the final ending point LE0 of the line [3], equals to the index array IS[4] representing the address of the first starting point LS1 of the line [4]. In this case, the index array IE[3] and the index array IS[4] are both "2".

Further, when a plurality of run length data are extracted on a line, such as one data having a starting point LS2 and a ending point LE2, and another data having a starting point LS3 and a ending point LE3 on a line [5], each LNO value is memorized in each array element of the run length data memory buffer array LBUF, with increasing the LNO value, such as LBUF[LNO=4]=LS2, and LBUF[LNO=5]=LE2. And a value of an index array IE[F], is incremented by "2" when an ending point LE is memorized. Thus, starting points and ending points of run length data, that are assigned index arrays IS[F] and IE[F], are stored in order in the run length data memory buffer array LBUF, as each LNO is equivalent to each array index (a run length data storing step).

Figure 6:
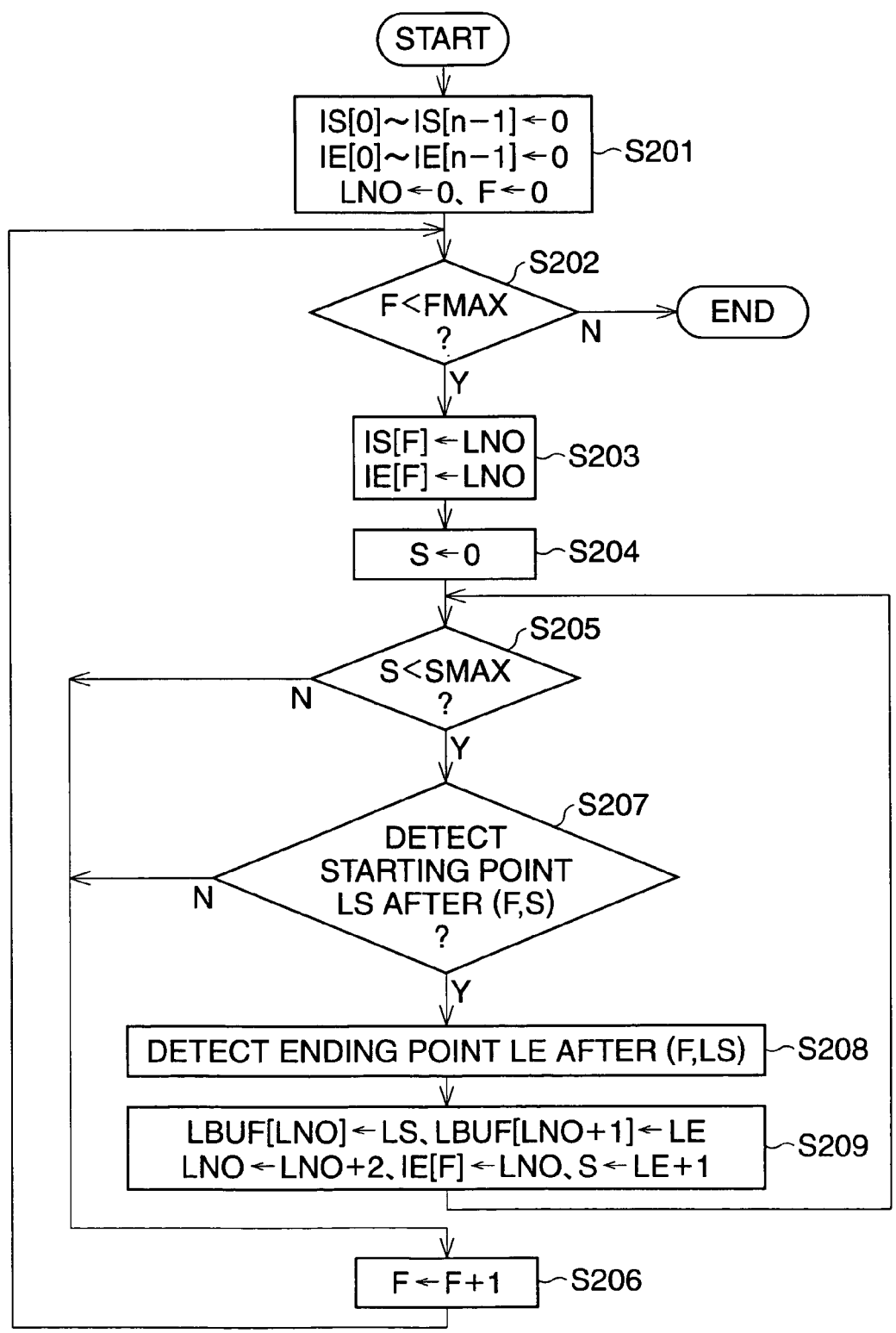
FIG. 6 is a flowchart representing an index-addition routine of starting points and ending points of the run length data.

FIG. 6 is a flowchart representing an index-addition routine of starting points and ending points of the run length data.

The method of adding indexes to starting points and ending points of the run length data, when scanning from line [0] to line [n−1], is explained below, referring the flowchart. At step S201, all variables of the "memory number" LNO relating to the order of extraction of starting points and ending points, indexes IS[F] and IE[F] are initialized.

At step S202, whether a value "F" of a line [F] that includes starting points and ending points to be scanned, is smaller than the F-coordinate system value of "FMAX" on a line "F=FMAX" that determines the end of the image 26, or not, is judged. When the value "F" of a line [F] is not smaller than the value "FMAX", the value "F" is equivalent to the value "FMAX", that is, the index-addition routine is ended because all starting and ending points on the line [F] have already been processed. When the value "F" of a line [F] is smaller than the F-coordinate system value "FMAX", at step S203, the "memory number" LNO of the starting point or ending point memorized next in the LBUF, is checked. At step S204, the S-coordinate system value of the scanning starting point is set as "0" for initialization.

At step S205, whether an S-coordinate system value of a starting point or an ending point is smaller than the S-coordinate system value of "SMAX" on a line "S=SMAX" that determines the end of the image 26, or not, is judged. When the S-coordinate system value of the starting point or the ending point is not smaller than the S-coordinate system value of "SMAX", that is, the S-coordinate system value is equivalent to the value of "SMAX", the control proceeds to step S206. When the S-coordinate system value of the starting point or the ending point is smaller than the value of "SMAX", the control proceeds to step S207.

At step S206, the line number "F" is incremented by "1" to process starting and ending points on the line [F+1] having a "1" larger F-coordinate system value, because all starting points and ending points on the line [F] have already been processed.

At step S207, after having detected an ending point (F,S) on a line [F], further scanning to detect a starting point of another run length data from a point (F,S+1) is carried out. As a result of scanning, if a starting point LS is detected, the control proceeds to step S208, and if no starting point is detected, the control proceeds to step S206.

At step S208, an ending point of the run length data whose starting point was detected at step S207, is searched, and detected. At step S209, an S-coordinate system value of the starting point LS is stored in an array element of the run length data memory buffer array LBUF represented by a "memory number" LNO, and an S-coordinate system value of the ending point LE is also stored as another array element of the run length data memory buffer array LBUF represented by another "memory number", (LNO+1). Then, for further memory storage, a "memory number" (LNO+2) is set as new "memory number" LNO, new IE[F] is also set based on the new "memory number" LNO, and in terms of the S-coordinate system values, the S-coordinate system value of "the ending point LE plus 1" to be scanned is also set as a new "S" value. After the step S209, the necessary steps for finishing the extraction of all starting points and ending points on all the lines to be scanned, are repeated until ending extraction. Finally, when an F-coordinate system value of a starting point is judged as being equivalent to the F-coordinate system value "FMAX" at step S202, the index-addition routine ends.

A part of the run length data extracted from the image, and stored with indexes, having duplicated area with the other run length data on a next line, are grouped to become grouped run length data (a data grouping step). The method of grouping the run length data, is explained below.

Figure 7:
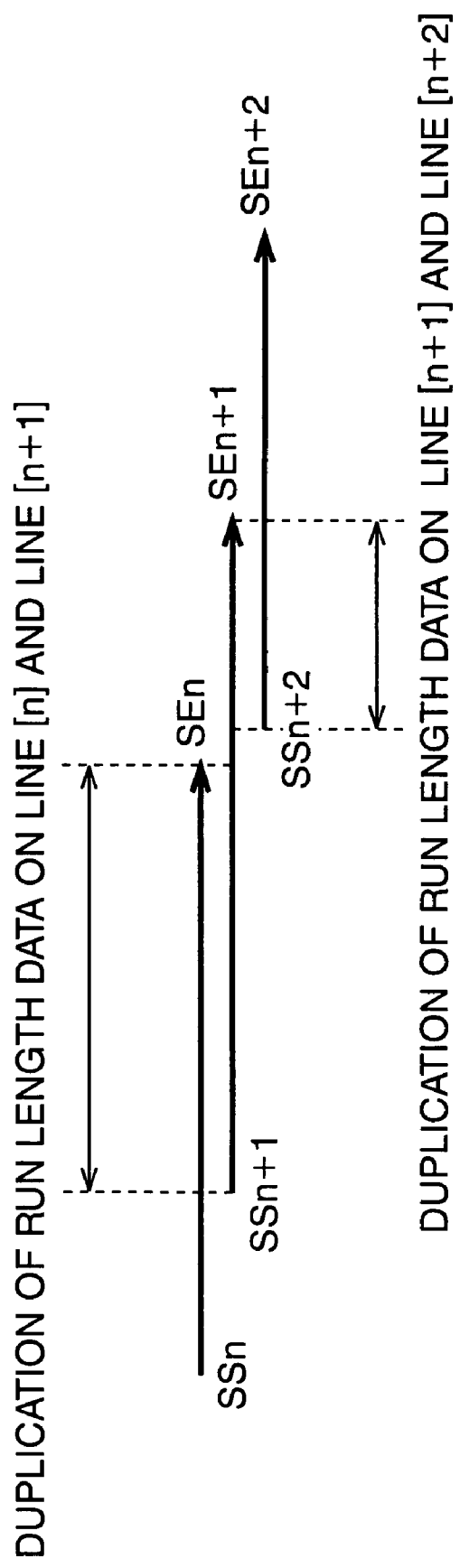
FIG. 7 is a conceptual view showing duplicated run length data.

FIG. 7 is a conceptual view showing run length data duplicating each other.

First, previously stored run length data is scanned from a line [0]. Then it is checked that one run length data (having starting point whose S-coordinate system value is a "scan-starting S-coordinate system value" SSn, and having an ending point whose S-coordinate system value is a "scan-ending S-coordinate system value" SEn) on a line [n], has duplicated S-coordinate system values with another run length data (having starting point whose S-coordinate system value is (SSn+1), and having ending point whose S-coordinate system value is (SEn+1)) on a line [n+1], or not. That is, whether two neighboring run length data have the same S-coordinate system values or not, is checked (a run length data duplication detecting step).

When two run length data have a duplicated area, they are judged to configure the same closed figure. The detection process is repeated until all duplication has been detected, and then, all run length data judged to configure the same closed figure, are grouped (a data grouping step). Note that, in case one run length data on a line [n] has duplication between plural run length data on a line [n+1] or a line [n−1], only one run length data having the smallest S-coordinate system value on a line [n+1] or a line [n−1], is grouped. The run length data shown in FIG. 7, are all grouped together.

Figure 8:
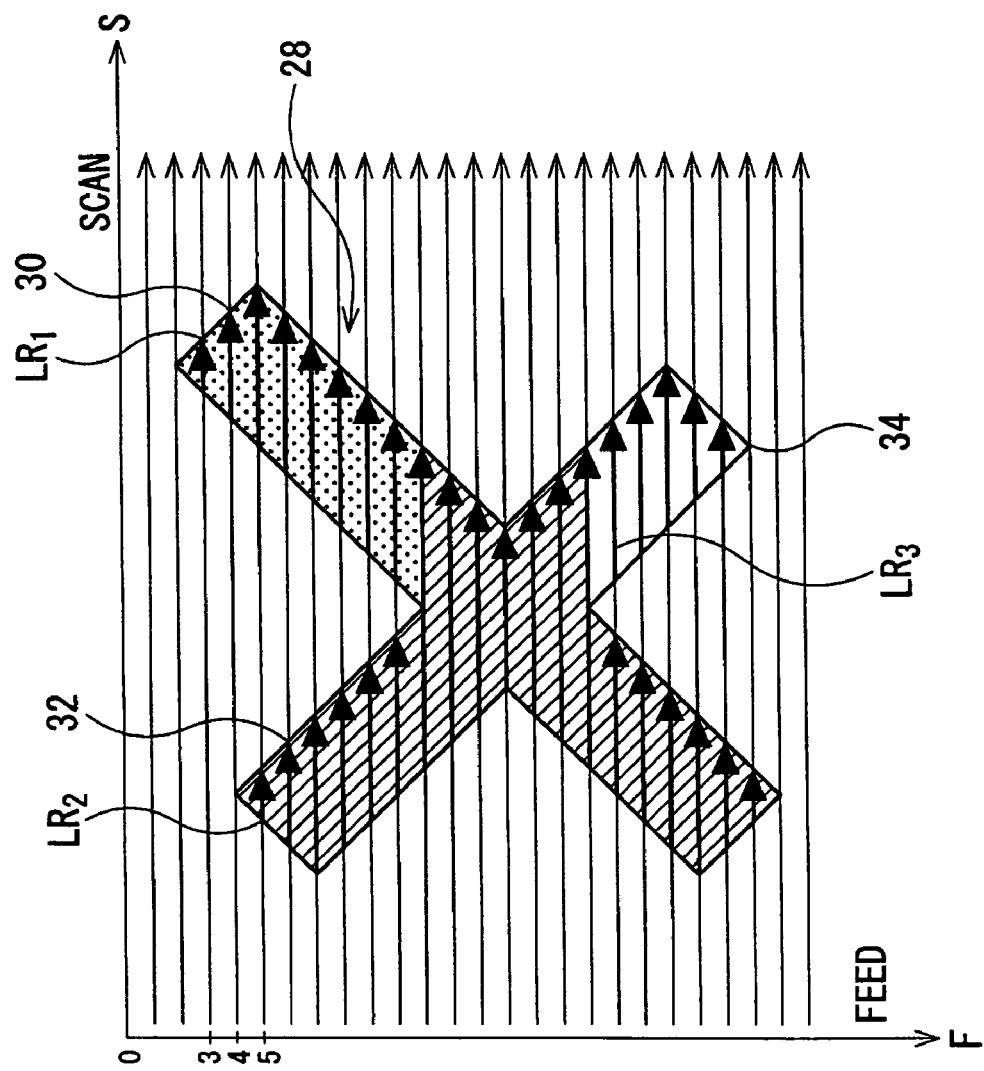
FIG. 8 is a view showing grouped run length data inside the drawn image.

FIG. 8 is a view showing grouped run length data inside the drawn image 28.

Scanning for detecting duplicated run length data, starts at the S-axis, and continues line by line. As a result of grouping from the run length data LR1 on a line [3], a first divided image 30 is configured, and similar to this, a second divided image 32 is configured due to grouping from the run length data LR2, and a third divided image 34 is configured due to grouping from the run length data LR3. Note, as mentioned above, plural run length data on the same line, are not grouped, therefore, run length data inside the single closed image 28, can be divided into plural groups as shown by FIG. 8.

Figure 9:
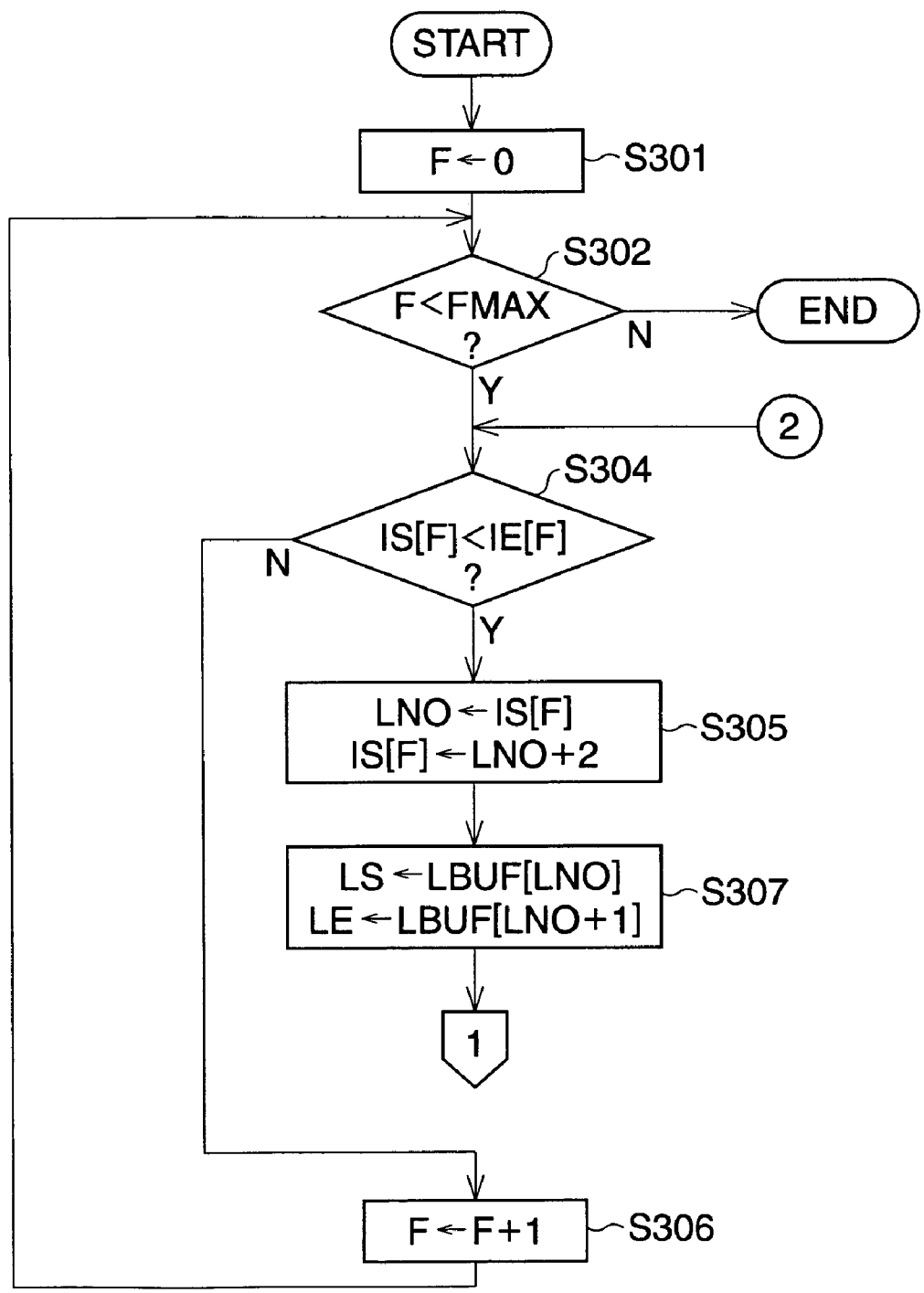
FIG. 9 is a flowchart representing reading of run length data.
Figure 10:
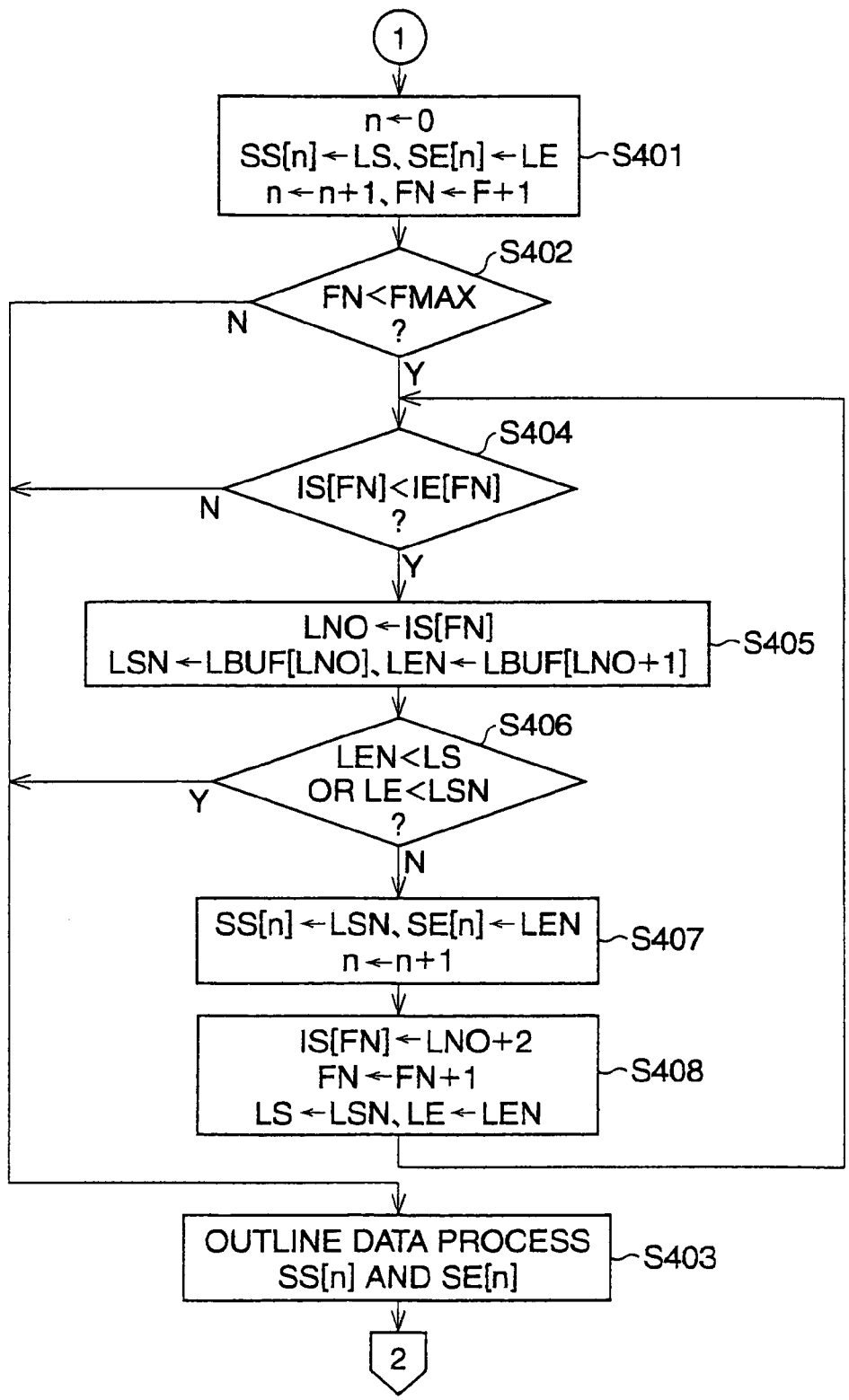
FIG. 10 is a flowchart representing grouping of read run length data.

FIG. 9 and FIG. 10 are flowcharts representing a run length data grouping routine. FIG. 9 shows a reading of a run length data on a line, and FIG. 10 shows a grouping of read run length data having duplicated S-coordinate system values.

First, at step S301, an F-coordinate system value is set to "0" to start reading from the line [0] (S-axis), the same as for the scanning. At step S302, whether a value "F" of a line [F] is smaller than the F-coordinate system value of "FMAX" on a line "F=FMAX" that determines the end of the image 26, or not, is judged. When the value "F" of a line [F] is not smaller than the value "FMAX", the value "F" is equivalent to the value "FMAX", and this fact means that all subjected run length data have already been grouped. Therefore, the run length data grouping routine ends. When the value "F" of a line [F] is smaller than the F-coordinate system value "FMAX", the control proceeds to step S304.

At step S304, whether an index array IS[F] is smaller than an index array IE[F] or not, that is, a run length data exists on a line [F] or does not exist, is judged. When an index array IS[F] is smaller than an index array IE[F], that is, a run length data exists, the control proceeds to step S305. On the other hand, when an index array IS[F] is not smaller than an index array IE[F], that means, the index array IS[F] is the same as the index array IE[F], and no more run length data exists on the line [F]. In this case, the control proceeds to step S306. At step S305, a "memory number" LNO representing an address of the first starting point of all the starting points which have been subjected to the grouping process, is read from the index array IS[F], and a new "memory number" (LNO+2) is put into the index array IS[F]. At step S307, an array element of the LBUF represented by the "memory number" LNO read at step S305, that is the S-coordinate system value of the starting point LS, is read, and another array element represented by the "memory number" (LNO+1), that is the S-coordinate system value of the ending point LE corresponding to the starting point LS, is also read. And then the control proceeds to step S401 (see FIG. 10).

At step S306, the line number [F] is incremented by "1" for processing the next line [F+1] because reading of all the starting and ending points which were subjected to grouping process, on the line [F] is finished. And each step after S302 is repeated.

At step S401 (see FIG. 10), the S-coordinate system values of the starting point LS and the ending point LE, both read at step S307, are stored in a scan-starting point array SS[n] and an scan-ending point array SE[n] respectively. Then, the F-coordinate system value of the line [F+1] next to the line [F], is defined as an operating feed coordinate value "FN". An index "n" of the scan-starting point array SS[n] and the scan-ending point array SE[n] is a variable representing line numbers of subjected of groupings, and the index "n" is incremented by "1".

At step S402, whether the operating feed coordinate value "FN" is smaller than the F-coordinate system value of "FMAX", or not, is judged. When the operating feed coordinate value "FN" is not smaller than the value "FMAX", that is, the value "FN" is equivalent to the value "FMAX", this fact means that all the run length data are already grouped. And then, the control proceeds to step S403. On the other hand, when the operating feed coordinate value "FN" is smaller than the F-coordinate system value "FMAX", the control proceeds to step S404.

At step S404, whether an index array IS[FN] is smaller than an index array IE[FN] or not, that is, a run length data exists on a line [FN] or does not exist, is judged. When an index array IS[FN] is smaller than an index array IE[FN], that is, a run length data exists, the control proceeds to step S405. On the other hand, when an index array IS[FN] is not smaller than an index array IE[FN], that means, the index array IS[FN] is same as the index array IE[FN], no more run length data exists on the line [FN]. In this case, the control proceeds to step S403.

At step S405, the run length data on the line [FN], that is, a pair of S-coordinate system values of the starting point LSN and the ending point LSE, is read from the LBUF (the same as in the steps S305 and S307), and the control proceeds to step S406.

At step S406, whether the S-coordinate system value of the ending point LEN on the line [FN] is smaller than the S-coordinate system value of the starting point LS on the line [F], and whether the S-coordinate system value of the starting point LSN on the line [FN] is larger than the S-coordinate system value of the ending point LE on the line [F], is determined. If at least one of these conditions is met, one run length data on the line [FN] and the other run length data on the line [F], are not duplicates of each other. In this case, the control proceeds to step S403. On the other hand, if either of two conditions at step S406 are not met, one run length data on the line [FN] and the other run length data on the line [F], have a duplicated area, and in this case, the control proceeds to step S407.

At step S407, the S-coordinate system value of the starting point LSN on the line [FN] is memorized in the scan-starting point array SS[n] for adding the starting point LSN to a group including the starting point LS on the line [F]. And then, the S-coordinate system value of the ending point LEN on the line [FN] is memorized in the scan-ending point array SE[n] for adding the ending point LEN to a group including the ending point LE on the line [F], as well. Further, for grouping run length data on the next line [FN+1], the variable "n" representing the line number of the subject line of the grouping process, is incremented by "1".

At step S408, for checking the duplication between run length data on the line [FN+1], and run length data on the next line [FN+2], the memory-number (LNO+2) is substituted in the index array IS[FN], the operating feed coordinate value (FN+1) is newly used, and both the starting point LSN and ending point LEN of the run length data on the line [FN], are set as the new staring point LS and the new ending point LE respectively. Then the steps S404 to S408 are repeated in accordance with need.

At step S403, out line data processes for a scan-starting point SS[n] newly added to a group of the scan-starting points SS (SS[0]–SS[n–1], hereinafter called a "starting point group"), and a scan-ending point SE[n] newly added to a group of the scan-ending points SE (SE[0]–SE[n–1], hereinafter called an "ending point group"), are conducted. And then, the control proceeds to step S304 (see FIG. 9), and steps thereafter are repeated in accordance with need.

Figure 11:
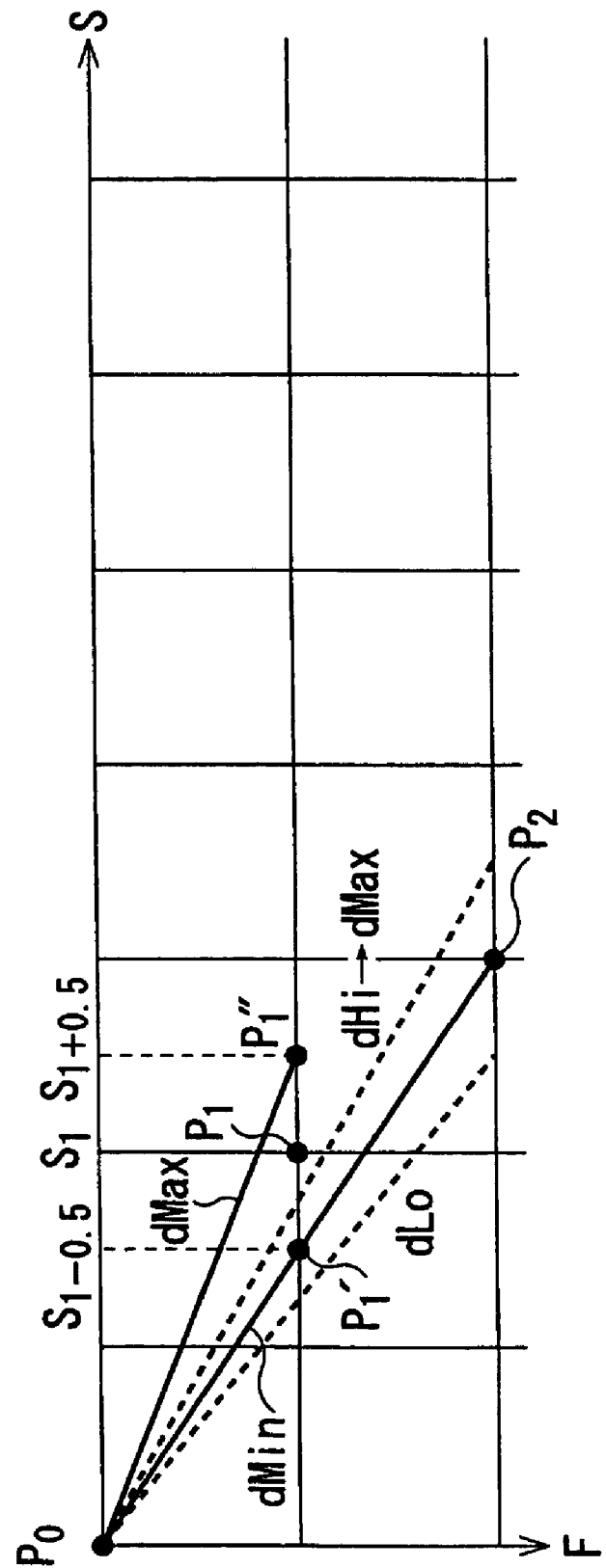
FIG. 11 is a conceptual view of creation of outline vector-graphic data.

FIG. 11 is a conceptual view of the creation of outline vector-graphic data from the starting point group SS or the ending point group SE.

When all of starting points included in the starting point group SS, and all ending points included in the ending point group SE are extracted, some points are extracted from the each group, and outline vector-graphic data, that is lines connecting extracted points to each other, is created (outline data creating step). A creation method of the outline vector-graphic data from the starting point group SS is explained below, and the creation method from the ending point group SE is omitted because it is the same as the creation method from the starting point group SS. The scan-starting point (SS[0]) which has the earliest scanning order in the starting point group SS, is set as "P0", and a scan-starting point having the second earliest scanning order is set as "P1". The S-coordinate system values of all of the scan-starting points are integers because these scan-starting points are on the image 26 as bitmap data. Therefore, when the S-coordinate-system value of the scan-starting point P1 is S1, and the difference in the F-coordinate-system values between the scan-starting point P0 and the point P1 is "1", a decline "d0" of the line P0 P1, that is determining the actual outline of the drawn image 28 on the drawing-coordinate-system, is larger than a decline "dMin" that is a decline of the line connecting the scan-starting point P0 and a point P1' whose S-coordinate system values is (S1–0.5), and the decline d0 is smaller than a decline "dMax" that is a decline of the line connecting the scan-starting point P0 and a point P1" whose S-coordinate system values is (S1+0.5). And a decline "d1" of the line P1 P2 connecting the point P1 and the point P2 having the next earliest scanning order to the point P1, is larger than a decline "dLo" and smaller than a decline "dHi" as well.

Here, when the decline "dLo" or "dHi" is in a range of "dMin" and "dMax", it is judged that all the scan-starting points P0 to P2 are on the same line. When it is not judged that all the scan-starting points ae on the same line, from a scan-starting point that is off the line, a new line is created. When the decline "dLo" is larger than the decline "dMin", the decline "dMin" is updated by the decline "dLo", because a decline of a line between the point P0 and a point having larger F-coordinate system value, has higher reliability and less error impact than a decline of a line between the point P0 and a point having smaller F-coordinate system value. Therefore, when the decline "dHi" is smaller than the decline "dMax", the decline "dMax" is updated by the decline "dHi" as well. Following this algorithm, narrowing the decline range of the line determining the actual outline, this process is repeated for further scan-starting points. As a result of this process, some lines determining the outline of the drawn image, are created from the starting point group SS (a starting-side outline data creating step).

Figure 12:
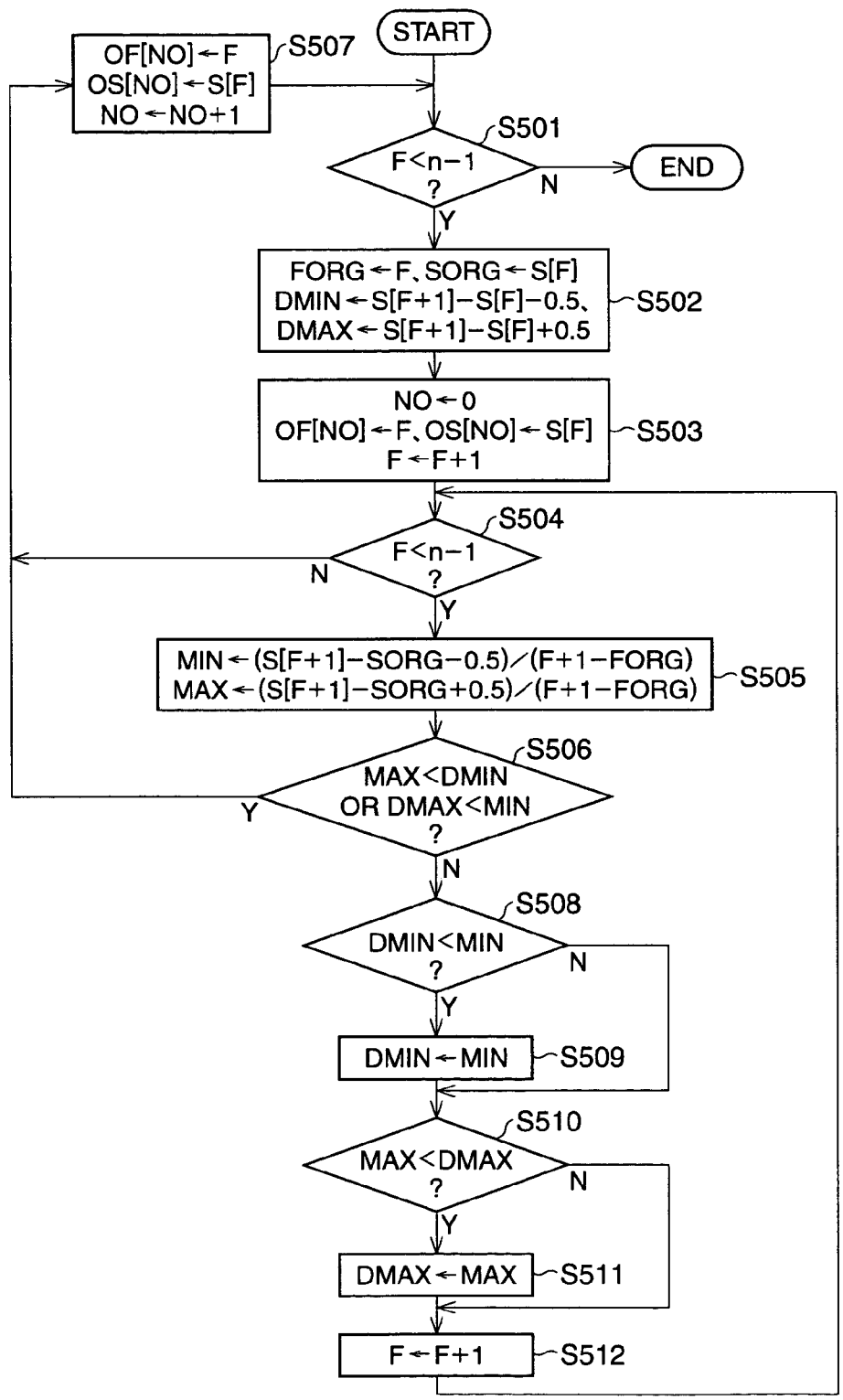
FIG. 12 is a flowchart representing the outline data creating routine based on the starting point group SS.

FIG. 12 is a flowchart representing the outline data creating routine from the starting point group SS (SS[0]–SS[n–1]).

At step S501, it is determined whether an F-coordinate system value "F" of a line number [F] is smaller than the value of (n–1) or not. When the value "F" of is not smaller than the value of (n–1), the value "F" is equivalent to the value of (n–1), and this fact means that all scan-starting points subjected to are already processed. Therefore, the outline data creating routine ends. When the value "F" is smaller than the value of (n–1) the control proceeds to step S502.

At step S502, the F-coordinate system value and the S-coordinate system value of the scan-starting point P0 are set as the original F-coordinate system value "FORG" and the original S-coordinate system value "SORG" respectively. Here, the value of the FORG is "F", and the value of the SORG is "S[F]". Further, a minimum value and a maximum value of a decline of a line between the scan-starting point P0 and the point P1 whose S-coordinate system value is S[F+1] and F-coordinate system value is "1" larger than that of the point P0, are set as DMIN and DMAX respectively. Here, DMIN and DMAX are represented by formulas (1) and (2).

$$DMIN = (S[F+1] - S[F] - 0.5)/1 \quad (1)$$

$$DMAX = (S[F+1] - S[F] + 0.5)/1 \quad (2)$$

At step S503, an outline point number "NO" as mentioned below, is set as "0", the "FORG" is set as an outline F-coordinate system value "OF", the "SORG" is set as an outline S-coordinate system value "OS", and the F-coordinate system value "F" is updated by the value "F+1". At step S504, whether the new F-coordinate system value "F" is smaller than the value of (n–1) or not, is judged. When the F-coordinate system value "F" is not smaller than the value of (n–1), the value "F" is equivalent to the value of (n–1), and this fact means that all of the starting points in the starting point group SS are already processed. And then, the control proceeds to step S507. When the value "F" is smaller than the value of (n–1), the control proceeds to step S505.

At step S505, a minimum value and a maximum value of a decline of a line between the scan-starting point P0 and the scan-starting point SS[m] (hereinafter "line P0–SS[m]") are obtained as a minimum decline "MIN" and a maximum decline "MAX" respectively. At step S506, the maximum decline "MAX" and a minimum value of a decline of a line between the scan-starting point P0 and the scan-starting point SS[m–1] (hereinafter "line P0–SS[m–1]"), "DMIN" are compared. In addition, the minimum decline "MIN" and a maximum value of a decline of the line P0–SS[m–1], "DMAX" are also compared. When at least one of the two formulas (3) and (4) is satisfied, it is judged that the line P0–SS[m] and the line P0–SS[m–1] are different lines, and that the line P0–SS[m–1] and a line between the scan-starting point SS[m–1] and the scan-starting point SS[m] (hereinafter "line SS[m–1]–SS[m]") are also different. Therefore, it is judged that the outline vector-graphic data turns at the scan-starting point SS[m–1]. Then the turning point of the scan-starting point SS[m–1], is defined as an "outline point".

$$MAX < DMIN \quad (3)$$

$$DMAX > MIN \quad (4)$$

On the other hand, when the neither formula is satisfied, it is judged that the line P0–SS[m] and the line P0–SS[m–1] are on the same line, and the control proceeds to step S508.

At step S507, the F-coordinate system value of the newly set outline point, is memorized as an outline F-coordinate system array OF[NO], the S-coordinate system value of the outline point is memorized as an outline S-coordinate system array OS[NO], and the outline point number "NO" is increased by "1", and the control proceeds to step S501.

At steps S508 to S511, a range of a decline of the line P0–SS[m] created by the addition of the scan-starting point SS[m] to the line P0–SS[m–1], is obtained. First, at step S508, whether the "DMIN", the minimum decline of the line P0–SS[m–1], is smaller than the "MIN", the minimum decline of the line P0–SS[m], or not, is judged. When the "DMIN" is smaller than the "MIN", the control proceeds to step S509. At step S509, the "DMIN" is updated by the "MIN". When the "DMIN" is not smaller than the "MIN" at step S509, the control proceeds to step S510 without updating the "DMIN".

At step S510, it is judged whether the maximum decline "MAX" of the line P0–SS[m] is smaller than the maximum decline of "DMAX" of the line P0–SS[m–1]. At step S511, the "DMAX" is updated by the "MAX", and the control proceeds to step S512. On the other hand, when the "MAX" is not smaller than the "DMAX", "DMAX" is not updated. At step S512, the value of (F+1) is set as the new F-coordinate system value for further memorization, then the control proceeds to step S504. The above-mentioned steps are repeated so that a starting-side outline data is created (a starting-side outline data creating step).

Note that, as mentioned above, an ending-side outline data is also created by the same method as the starting-side outline data represented by the steps S501-S512 (an ending-side outline data creating step).

Figure 13:
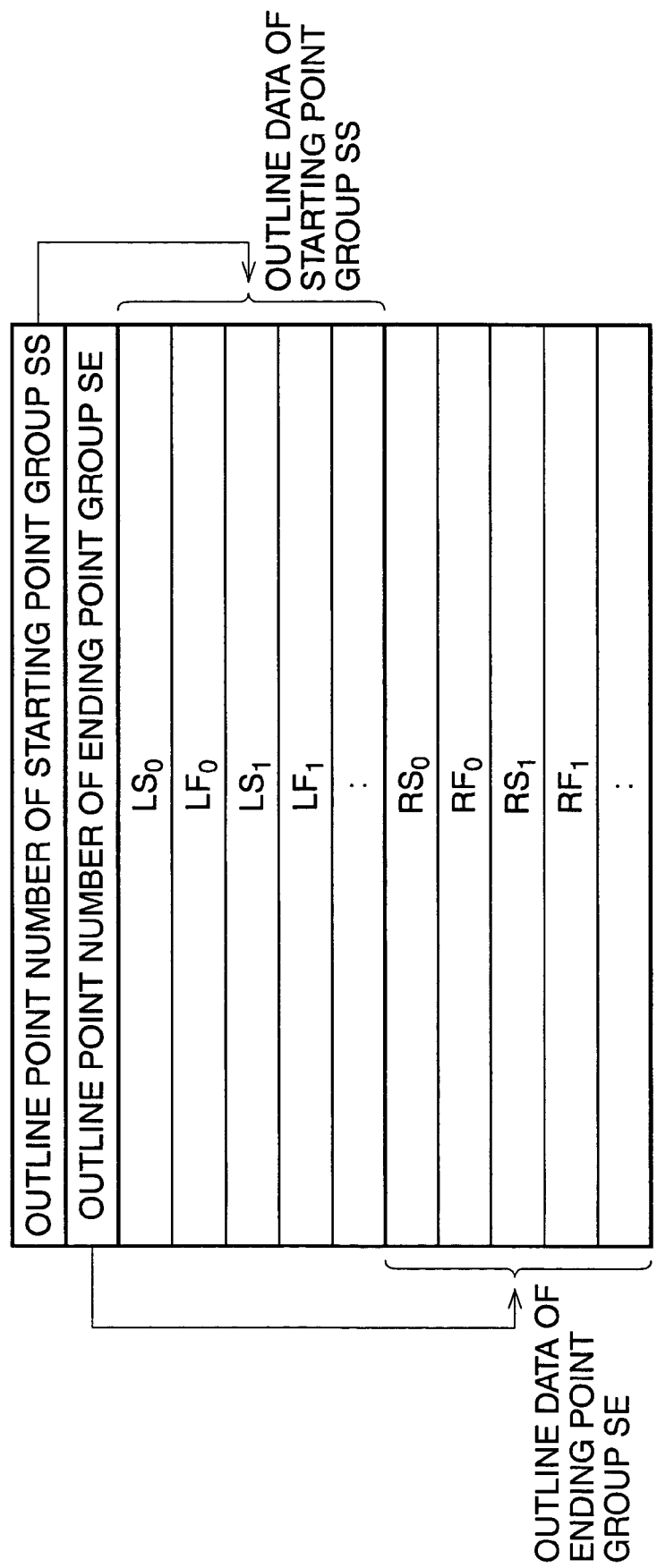
FIG. 13 is a view of the vector-graphic data finally obtained.
Figure 14:
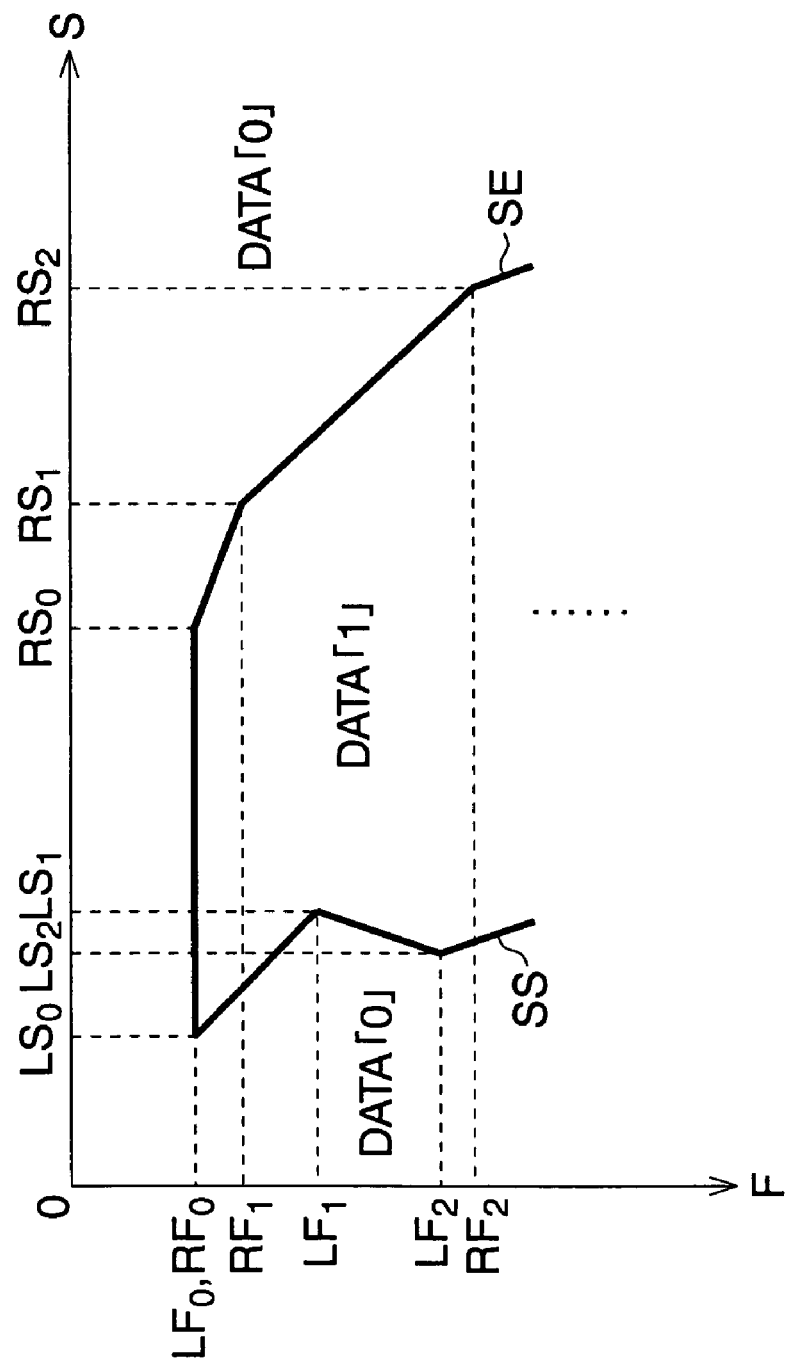
FIG. 14 is a view showing the drawn image surrounded by the starting point group SS and the ending point group SE.

FIG. 13 is a view of the vector-graphic data that is finally obtained. FIG. 14 is a view of the drawn image surrounded by the starting point group SS and the ending point group SE having turning points.

The starting-side outline data based on the starting point group SS, and the ending-side outline data based on the ending point group SE, are gathered and recreated as being one data, as shown by FIG. 13. And then, the drawing is carried out by the drawing apparatus 10, to draw the inside of the closed image having consequent segments and turning points, and surrounded by the starting point group SS and the ending point group SE.

As mentioned above, one drawn image is represented by outline vector graphic data of outlines, and the vector graphic data is defined by the coordinate system values. Therefore, the data amount is remarkably reduced because data of the scan-starting points and the scan-ending points excluding the turning points becomes unnecessary.

Figure 15:
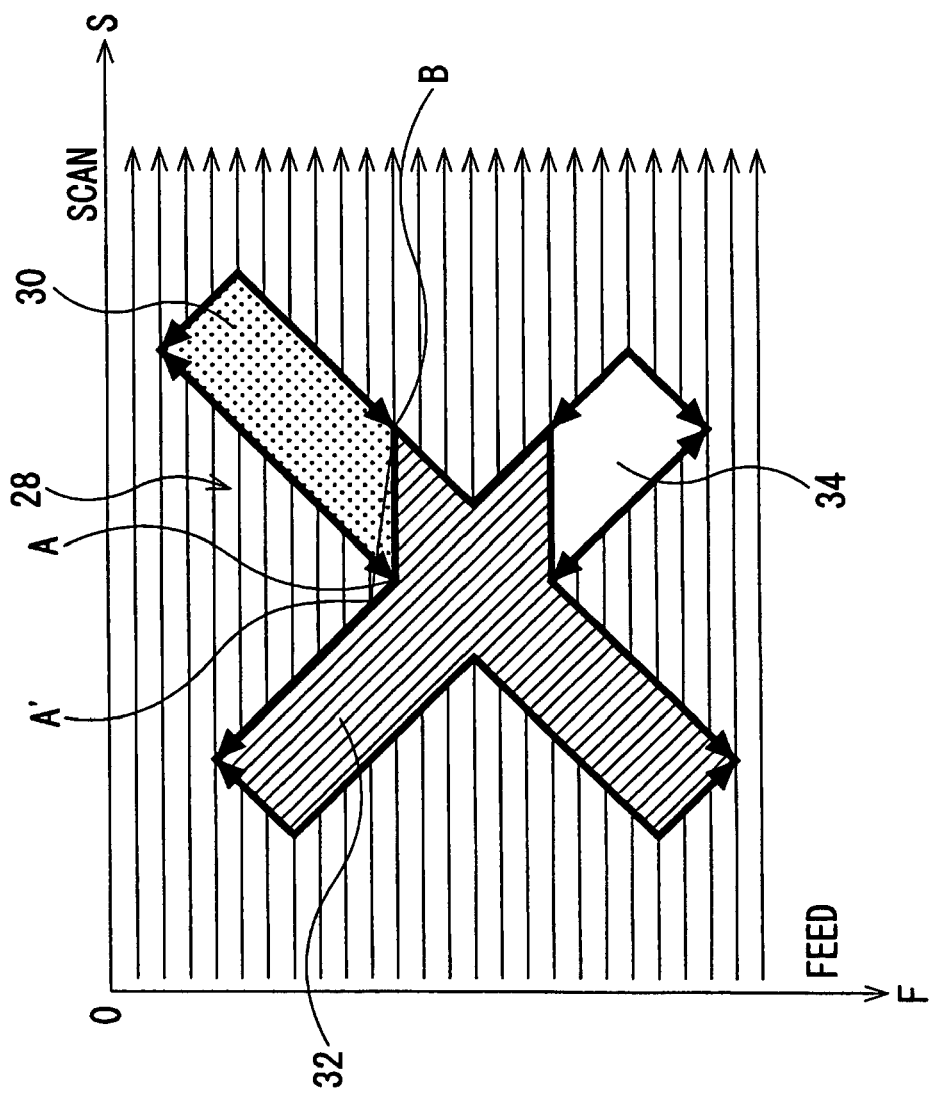
FIG. 15 is a view showing the outline vector graphic data based on the outlines of the divided images.

FIG. 15 is a view showing the outline vector graphic data based on the outlines of the divided images or groups 30, 32, and 34.

Here, each of the divided images or groups 30, 32, and 34 of the drawn image 28, is represented by plurality of outline vector graphic data. The second divided image or group 32 having the most complex shape, is configured by only "10" turning points, therefore, the data amount is reduced. Note that, following above mentioned vector graphic data creation method, the point A does not become a turning point. Therefore, the outline vector graphic data of the line AB, parallel to the S-axis, is not created but the outline vector graphic data connecting the turning point A' and the turning point B is created. As a result of this, an error where the outline vector graphic data does not represent the actual figure to be drawn, may occur. However, a correction for the error is actually unnecessary, because the outline vector graphic data is created by many turning points extracted from a plurality of scan-starting points and scan-ending points, therefore, the error is very small although it is enlarged in FIG. 15.

When high-resolution is not required, the condition for creating a line, that is, for extracting turning points from the starting point group and the ending point group, can be loosened, and then, the number of the extracted turning points can be reduced. Thus, the amount of excluded data (hereinafter "excluded data") is increased by the thinning process, so that the resolution on the exposure becomes low, and the data amount is reduced. For example, in the step S502 mentioned above, instead of formulas (1) and (2), formulas (5) and (6) whose "d" values are more than "0.5", such as "1.0", can be used. In this case, a "resolution ratio" R defined as "a resolution of the creation of the outline vector graphic data /a resolution of the drawing apparatus" becomes "½", therefore, although the outline of the drawn figure becomes rough, the data amount is reduced.

$$DMIN=(S[F+1]-S[F]-d)/1 \quad (5)$$

$$DMAX=(S[F+1]-S[F]+d)/1 \quad (6)$$

In the embodiment, an image 26 is formed from the drawing data by a one-time bitmap process. However, when it is difficult to create an entire image at one time, due to the limitation of the CPU 16, and the capacity of the image memory 18, part of the image is created based on the part of the drawing data, by dividing the drawing data. In this case, part of the image is created, and the data extracting step, and the steps following the data extracting step, are repeated so that the outline vector-graphic data for the whole image can be created. In this case, for prompt processing of the drawing data, the creation of a new image, the run length data extraction based on the partial image already created, and the processes after extraction, are preferably carried out simultaneously.

In the embodiment, the drawing data is the processed in the drawing apparatus 10, however, this process can be conducted at workstations such as the CAD system 20, and created outline vector graphic data can be transmitted to the drawing apparatus 10.

As mentioned above, the invention enables a data processing method where the amount of the data representing figures to be drawn is reduced.

Finally, it will be understood by those skilled in the art that the foregoing description is of preferred embodiments of the method and apparatus, and that various changes and modifications may be made to the present invention without departing from the spirit and scope thereof.

The present disclosure relates to subject matters contained in Japanese Patent Application No.2003-314009 (filed on Sep. 5, 2003) which is expressly incorporated herein, by reference, in its entirety.

The invention claimed is:

1. A drawing data processing method comprising:
   extracting run length data from an image, as raster-graphic data representing a figure to be drawn, the extracting comprising:
   extracting coordinate system values of a starting point and an ending point of the run length data by scanning the image along a scanning line that is parallel to a coordinate axis of a coordinate system that defines the image; and
   storing run length data, in which the coordinate system values of the starting point and the ending point are stored in a data memory, the starting point and the ending point being related to a line number defining the scanning line;
   grouping the run length data to become grouped run length data, the grouping comprising:
   detecting run length data duplication in which duplication of first run length data on a first scanning line and second run length data on a second scanning line, adjacent to the first scanning line is detected, based on the coordinate system values of starting points and ending points of the first run length data and the second run length data and line numbers of the first scanning line and the second scanning line; and
   creating, when a duplication of the first and the second run length data is detected in the detecting run length data duplication, a starting points group by grouping the starting points of the first run length data on the first scanning line and the second run length data on the second scanning line and an ending points group by grouping the ending points of the first and second run length data; and
   creating outline vector-graphic data, having a smaller data amount than a data amount of the raster-graphic data, and based on an outline of the figure represented by the grouped run length data.

2. The drawing data processing method according to claim 1, wherein creating the outline data comprises:
   creating starting-side outline data in which starting-side outline vector-graphic data is created from the starting points group, and
   creating ending-side outline data in which ending-side outline vector-graphic data is created from the ending points group.

3. The drawing data processing method according to claim 2, wherein the creating the outline data further comprises:
   extracting outline points in which the outline points are extracted from the starting-side outline vector-graphic data, after approximating the starting-side outline vector-graphic data to continuous segments, by using a thinning process in which part of the starting-side outline vector-graphic data is excluded as excluded starting-side outline vector-graphic data, and the outline points are extracted from the ending-side outline vector-graphic data, after approximating the ending-side outline vector-graphic data to continuous segments, by using a thinning process in which part of the ending-side outline vector-graphic data is excluded as excluded ending-side outline vector-graphic data.

4. The drawing data processing method according to claim 3, wherein in the outline points extracting, a ratio of the excluded starting-side outline vector-graphic data to the starting-side outline vector-graphic data can be changed, and a ratio of the excluded ending-side outline vector-graphic data to the ending-side outline vector-graphic data can be changed, by setting an optional resolution for drawing the figure.

5. The drawing data processing method according to claim 1, further comprising:
   forming an image in which the image is formed by processing vector-graphic data.

6. The drawing data processing method according to claim 5, further comprising:
   transmitting all information on the figure, as the vector-graphic data representing the figure to a drawing data processing apparatus in which the drawing data processing method is executed.

7. The drawing data processing method according to claim 6, wherein in the image forming, part of an image is formed by processing part of the vector-graphic data; and the image forming, the data extracting, the data grouping, and the outline data creating are repeated so that the outline vector-graphic data represents all information on the figure.

8. The drawing data processing method according to claim 6, wherein the vector-graphic data comprises plural layers.

9. A drawing data processing method comprising;
forming an image, as raster-graphic data representing a figure to be drawn, by processing vector-graphic data representing the figure;
extracting run length data from the image, the extracting comprising:
extracting coordinate system values of a starting point and an ending point of the run length data by scanning the image along a scanning line that is parallel to a coordinate axis of a coordinate system that defines the image; and
storing run length data in which the coordinate system values of the starting point and the ending point are stored in a data memory, the starting point and the ending point being related to a line number defining the scanning line;
grouping the run length data to become grouped run length data, the grouping comprising:
detecting run length data duplication in which duplication of first run length data on a first scanning line and second run length data on a second scanning line, adjacent to the first scanning line is detected, based on the coordinate system values of starting points and ending points of the first run length data and the second run length data and line numbers of the first scanning line and the second scanning line; and
creating, when a duplication of the first and the second run length data is detected in the detecting run length data duplication, a starting points group by grouping the starting points of the first run length data on the first scanning line and the second run length data on the second scanning line and an ending points group by grouping the ending points of the first and second run length data; and
creating outline data in which outline vector-graphic data, having a smaller data amount than a data amount of the vector-graphic data, and is based on an outline of the figure represented by the grouped run length data; and
transmitting the outline vector-graphic data from a workstation in which the data extracting data grouping, and the outline data creating are executed, to a drawing apparatus for drawing the figure.

10. A drawing data processing apparatus comprising:
a data extractor that extracts run length data from an image, as raster-graphic data representing a figure to be drawn, said data extractor being configured to extract coordinate system values of a starting point and an ending point of said run length data by scanning said image along a scanning line that is parallel to a coordinate axis of a coordinate system that defines said image;
said data extractor being further configured to store run length data in which the coordinate system values of said starting point and said ending point are stored in a data memory, said starting point and said ending point being related to a line number defining said scanning line,
a data grouping processor that groups said run length data to become grouped run length data, said data grouping processor being configured to detect run length data duplication in which duplication of first run length data on a first scanning line and second run length data on a second scanning line, adjacent to said first scanning line is detected, based on the coordinate system values of starting points and ending points of said first run length data and said second run length data and line numbers of said first scanning line and said second scanning line;
said data grouping processor being further configured to create, when a duplication of said first and said second run length data is detected by said data grouping processor, a starting points group by grouping said starting points of said first run length data on said first scanning line and said second run length data on said second scanning line and an ending points group by grouping said ending points of said first and said second run length data,; and
an outline data creator that creates outline vector-graphic data having a smaller data amount than a data amount of said raster-graphic data, and based on an outline of said figure represented by said grouped run length data.

11. The drawing data processing apparatus according to claim 10, further comprising:
an image former that forms said image by processing vector-graphic data.

12. The drawing data processing apparatus according to claim 11, further comprising:
a receiver that receives information on said figure, as said vector-graphic data representing said figure to be drawn.

13. The drawing data processing apparatus according to claim 10, further comprising:
a transmitter that transmits said outline vector-graphic data to a drawing apparatus for drawing said figure.

14. A drawing data processing system comprising a workstation and a drawing data processing apparatus, wherein
said workstation comprises:
a transmitter that transmits information on a figure to be drawn, as vector-graphic data representing said figure; and
said drawing data processing apparatus comprises:
a receiver that receives said information as vector-graphic data representing said figure;
an image former that forms an image, as raster-graphic data representing said figure, by processing said vector-graphic data;
a data extractor that extracts run length data from said image, said data extractor being configured to extract coordinate system values of a starting point and an ending point of said run length data by scanning said image along a scanning line that is parallel to a coordinate axis of a coordinate system that defines said image;
said data extractor being further configured to store run length data in which the coordinate system values of said starting point and said ending point are stored in a data memory, said starting point and said ending point being related to a line number defining said scanning line;
a data grouping processor that groups said run length data to become grouped run length data, said data grouping processor being configured to detect run length data duplication in which duplication of first run length data on a first scanning line and second run length data on a second scanning line, adjacent to said first scanning line is detected, based on the coordinate system values of starting points and ending points of said first run length data and said second run length data and line numbers of said first scanning line and said second scanning line;
said data grouping processor being further configured to create, when a duplication of said first and said second run length data is detected by said data grouping processor, a starting points group by grouping said starting points of said first run length data on said first scanning line and said second run length data on said second scanning line and an ending points group by grouping said ending points of said first and said second run length data,; and an outline data creator that creates outline vector-graphic data, having a smaller data amount than a data amount of said vector-graphic data, and based on an outline of said figure represented by said grouped run length data.

15. A computer readable recording medium that stores a computer program configured for processing drawing data, the recording medium comprising:

an extracting code segment that extracts run length data from an image, as raster-graphic data representing a figure to be drawn, said extracting code segment configured to extract coordinate system values of a starting point and an ending point of the run length data by scanning the image along a scanning line that is parallel to a coordinate axis of a coordinate system that defines the image;

said extracting code segment further configured to store run length data in which the coordinate system values of the starting point and the ending point are stored in a data memory, the starting point and the ending point being related to a line number defining the scanning line;

a grouping code segment that groups the run length data to become grouped run length data, said grouping code segment configured to detect run length data duplication in which duplication of first run length data on a first scanning line and second run length data on a second scanning line, adjacent to the first scanning line is detected, based on the coordinate system values of starting points and ending points of the first run length data and the second run length data and line numbers of the first scanning line and the second scanning line;

said grouping code segment further configured to create, when a duplication of the first and the second run length data is detected in the detecting run length data duplication, a starting points group by grouping the starting points of the first run length data on the first scanning line and the second run length data on the second scanning line and an ending points group by grouping the ending points of the first and second run length data; and a creating code segment that creates outline vector-graphic data, having a smaller data amount than a data amount of the raster-graphic data, and based on an outline of the figure represented by the grouped run length data.

* * * * *